July 31, 1956     C. H. JORGENSEN     2,756,734
PRESSURE REGULATING APPARATUS
Filed Feb. 5, 1946
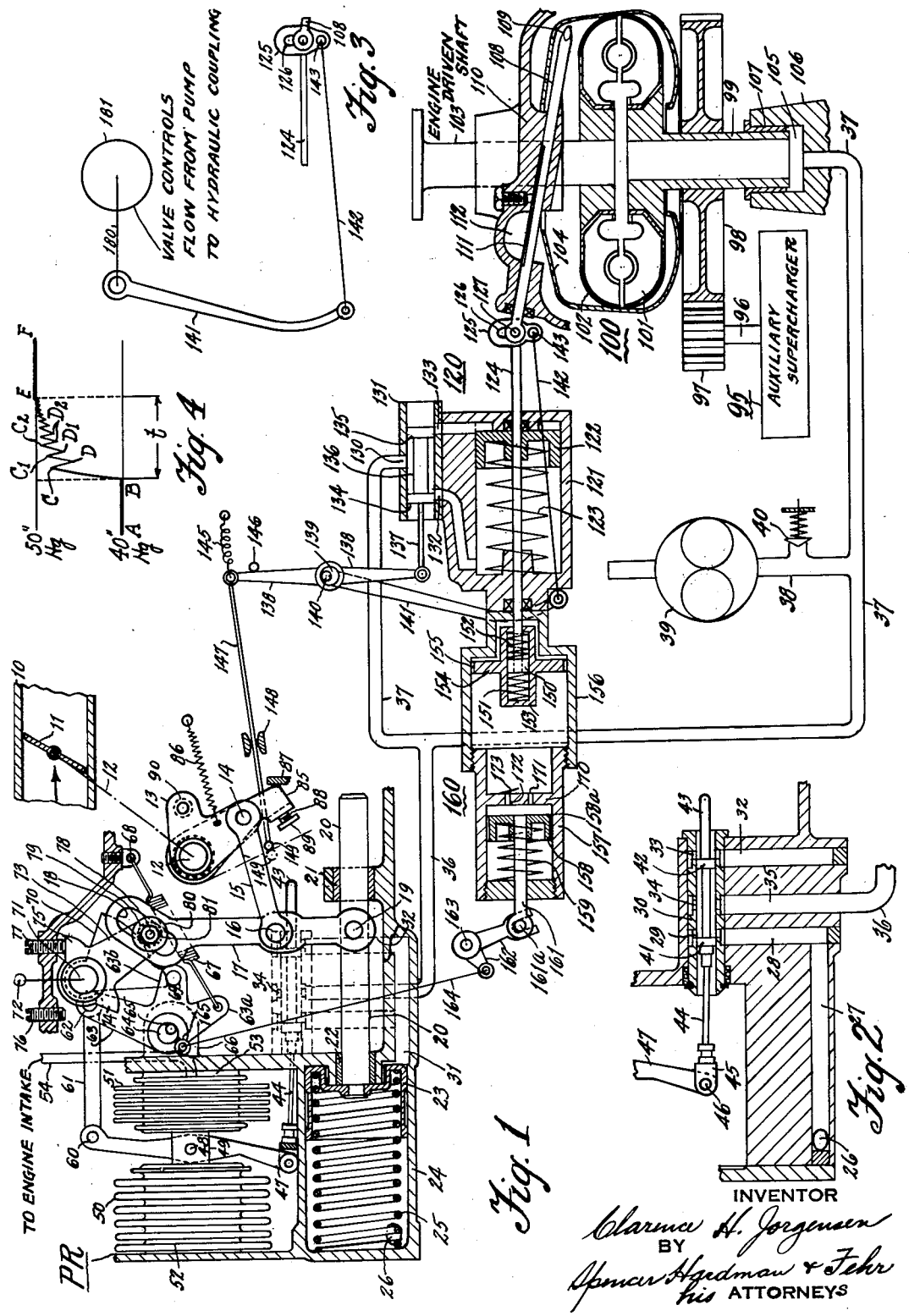
INVENTOR
Clarence H. Jorgensen
BY
Spencer Hardman & Fehr
his ATTORNEYS

United States Patent Office 2,756,734
Patented July 31, 1956

2,756,734

PRESSURE REGULATING APPARATUS

Clarence H. Jorgensen, Rochester, N. Y., assignor to General Motors Corporation, Detroit, Mich., a corporation of Delaware Application February 5, 1946, Serial No. 645,581

6 Claims. (Cl. 123—103)

This invention relates to apparatus for controlling the intake or manifold pressure of a supercharged internal combustion engine such as used in airplanes. The present apparatus is adapted especially for use with an engine having a main and an auxiliary supercharger.

It is an object of the present invention to provide means for causing an increase of the speed of the auxiliary supercharger whereby it becomes effective to maintain a selective manifold pressure which the main supercharger alone can not maintain above a certain altitude.

More particularly it is an object of the present invention to provide a stabilized control of the speed of the auxiliary supercharger in response to a demand for manifold pressure which is unsatisfied by the main supercharger alone.

Further objects and advantages of the present invention will be apparent from the following description, reference being had to the accompanying drawings wherein a preferred embodiment of the present invention is clearly shown.

In the drawings:

Fig. 1 is a diagram of the invention;

Fig. 2 is a fragmentary, sectional view of a valve for controlling a throttle-valve-operating-servo shown in Fig. 1;

Fig. 3 is a diagram showing a modification of a part of the apparatus shown in Fig. 1;

Fig. 4 is a chart illustrating the operation of the control of the auxiliary supercharger.

Referring to Fig. 1, the engine intake 10 is controlled by throttle valve 11 connected with a shaft 12 to which a lever 13 of a pressure regulartor PR is attached. Pin 14 connects lever 13 with a link 15 connected by pin 16 with a floating lever 17 having a slot 18 and connected by a pin 19 with a piston rod 20 guided in bearings 21 and 22 and connected with a piston 23 received by a cylinder 24 containing a spring 25 which urges the piston 23 toward the right. The left end of cylinder 24 is connected by passages 26, 27 and 28 with ports 29 of a valve guide 30. The right end of cylinder 24 is connected by passages 31 and 32 with ports 33 of valve guide 30. Guide 30 provides ports 34 connected by a passage 35, pipes 36, 37 and 38 with a fluid pressure pump 39, the pressure from which is regulated by pressure control valve 40. The distribution of pressure fluid entering the ports 34 to the ports 29 and 33 is controlled by the lands 41 and 42 of a valve 43 connected by a flexible rod 44, a clevis 45 and a pin 46 with a floating lever 47 pivoted on a pin 48 supported by the bridge 49 which connects the adjacent movable ends of bellows 50 and 51 whose remote ends 52 and 53 respectively are fixed. The bellows 50 is evacuated and bellows 51 is connected by pipe 54 with the engine intake. The bellows 50 and 51 have equal area so that the position of the pin 48 does not change with changes of atmospheric pressure. The bellows 50 and 51 contain springs (not shown) which are so constructed and calibrated that the relation between the displacement of the pin 48 and the values of engine intake pressure is substantially of linear relation, as disclosed in the patent of Jorgensen and Dermond, No. 2,572,865 of October 30, 1951.

Lever 47 is connected by pin 60 with a link 61 connected by pin 62 with a lever 63 journaled on a rod 64 having eccentric trunnions 65 rotatably supported by brackets, one of which is shown at 66. The arm 63a of lever 63 is connected with one end of a spring 67 attached to a fixed screw-eye 68. The arm 63b of the lever 63 carries a cam follower roller 69 urged by spring 67 into engagement with a pressure selecting cam 70 attached to a shaft 71 operated manually by lever 72.

Shaft 71 is attached to a lever 73 having stop lugs 74 and 75 for engaging stop screws 76 and 77 respectively. Lever 73 carries a stud 78 pivotally supporting a roller 79 retained by washer 80 and a nut 81 threaded on the stud. The roller 79 is received by the slot 18 of lever 17.

Throttle valve 11 is operated manually by the lever 72 and automatically by the piston rod 20. Valve 11 can be opened manually sufficiently to maintain flight at low altitude so that a safe landing can be made in the event of failure of the servo-motor to actuate the valve. As shown, the pressure selecting cam 70 is located in idle position and the bellows 51 is collapsed. The valve 43 is in position for connecting the intake ports 34 with the ports 29 which are connected with the left end of the cylinder 24. Therefore the piston 23 is urged right by oil pressure as well as by the pressure of the spring 25 which would operate to return the piston 23 to the right in the event of failure of oil pressure. By moving the lever 73 clockwise, the cam 70 is turned in the same position to a position for selecting a pressure suitable for flight. As the cam 70 so moves, the spring 67 causes the roller 69 to follow the cam, thereby causing counter-clockwise movement of levers 63 and 47 and movement of the valve 43 toward the right to connect ports 34 and 33 while ports 29 are connected with drain or return to the intake of the pump 39. This causes the piston 23 to move toward the left to effect an opening of the throttle valve sufficient to maintain the selected pressure. For pressure selections from minimum cruise and higher, the servo-motor operates to move the throttle valve into wide open position at the altitude which is critical for the pressure selected. For minimum cruise pressure selection, substantially full movement of the piston 23 to the left is required in order to open the throttle 11 completely at critical altitude for that pressure. As the pressure selection is increased, manually effected opening of the throttle valve increases. Therefore, the automatically effected opening of the throttle should decrease so that the throttle valve will not be moved further than its wide open position. Obviously a stop could be provided to limit such movement of the throttle valve. However, the controller provides its own limitation by hydraulically blocking movement of the piston 23 when the throttle valve arrives at wide open position. This hydraulic blocking is effected by mechanism which operates in response to the close approach of the throttle valve to wide open position. This mechanism comprises a lever 85 loosely journaled on the shaft 12 and normally urged counterclockwise by a spring 86 against a stop 87. The free end of lever 85 carries an adjustable screw 88 having a pad 89 for engaging the valve 43. Lever 13 carries a pin 90 for engaging lever 85 as lever 13 moves clockwise. When the valve 11 is nearly at wide open position, pad 89 begins to engage valve 43 then at a position connecting ports 33 and 34. By the time the throttle valve 11 has arrived at wide open position through the action of the servo piston 23, the valve 43 will have been pushed left in a position blocking ports 33 and 29. Therefore, the piston 23 is hydraulically blocked or locked in a position corresponding to wide open position of the throttle valve.

The altitude which is critical for any selected pressure is that altitude above which intake pressure begins to decrease substantially as altitude is increased. Therefore, in order to ascend rapidly above the altitudes which are critical for the selected pressures when the main supercharger is effective alone, it is necessary to increase the speed of the auxiliary supercharger above its idling speed.

The auxiliary supercharger 95 indicated diagrammatically is driven by a shaft 96 connected with a gear 97 meshing with a gear 98 connected with a shaft 99 connected with the driven part 101 of an hydraulic coupling 100. The driving member 102 of the coupling is connected with a shaft 103 driven by the engine. The coupling members are housed by a shroud 104 attached to the driving member 102. Oil is conducted from the pump 39 to the coupling 100 through pipe 37, recess 105 (in the support 106 for a shaft bearing 107) and the shaft 99. The rotating level of the oil within the coupling members 101 and 102 is determined by the location of an adjustable tube or dip-stick 108 open at its end 109 and guided for movement by a frame 110 which supports the shaft 103. The dip-stick 108 is provided with an outlet slot 111 from which oil can flow into a recess 112 and return to drain which is connected with the pump 39. When the end 109 of the dip stick 108 is located as shown, the rotating level of the oil will be the lowest. Hence the hydraulic coupling will have the greatest slip; that is, the shaft 99 will rotate at the lowest speed relative to the shaft 103. Movement of the dip-stick 108 toward the left increases the quantity of oil within the coupling members and thereby decreases the coupling slip. Hence the speed of the shaft 99 more nearly approaches the speed of the shaft 103 and the speed of the auxiliary supercharger 95 is increased.

The dip-stick 108 is positioned by an hydraulic servo motor 120 comprising a cylinder 121 receiving a piston 122 and a piston return spring 123. Piston 122 is connected with a rod 124, the right end of which terminates in a bar 125 having a slot 126 for receiving a pin 127 connected with the dip-stick 108. Pipe 37 is connected with inlet port 130 of a valve guide 131 having distributing ports 132 and 133 connected, respectively, with the left and right ends of cylinder 121. Ports 132 and 133 are controlled, respectively, by lands 134 and 135 of valve 136 connected by a flexible rod 137 with a lever 138 journaled on a shaft 139 having eccentric trunnions 140 journaled in fixed bearings. The shaft 139 is connected with a lever 141 connected by link 142 with a pin 143 attached to the bar 125. Spring 145 urges lever 138 against a stop 146. Lever 138 is connected with rod 147 slidable through a fixed guide 148 carrying a pin 149 located in the path of movement of lever 85. When lever 138 is against the stop 146, pin 149 is located in its full line position. When throttle valve 11 is at a position slightly less than wide open, lever 85 engages pin 149. As valve 11 is moved into fully wide open position, pin 149 is moved into position 149' thereby causing lever 138 to move counterclockwise and valve 136 to move right to connect ports 133 and to unblock port 132 so that it is connected with drain. Therefore, piston 122 of servo 120 moves left and moves the end 109 of the dip-stick 108 nearer to the center of the coupling thereby causing the speed of the auxiliary supercharger 95 to increase. Thus, the demanded pressure can be maintained by the operation of both superchargers in altitudes higher than those which are critical for the selected pressure when the main supercharger is operating alone.

The auxiliary supercharger continues to run at increased speed and the pressure builds up in excess of the demanded pressure whereupon the regulator moves the throttle valve 11 toward closed position. In doing so, the lever 13 moves counterclockwise and the lever 85 follows along thereby permitting spring 145 to move lever 138 clockwise and valve 136 moves left to block the connection between ports 130 and 133 and slightly to open the port 132 whereupon the piston 122 moves right to effect the slight reduction in the speed of the supercharger 95 and the pressure diminishes. The demand of the regulator being unsatisfied, the throttle valve is opened again and valve 136 moves right to establish the connection between ports 130 and 133 and to connect port 132 with drain and the speed of the supercharger increases. This cycle is repeated so long as it is necessary to increase the speed of the auxiliary supercharger in order to meet the pressure demand.

To a certain degree, stability of control is effected by virtue of the provision of means operated by the servo piston 122 and acting independently of movement of the throttle valve 11 for moving the valve 136. As the rod 124 moves left, link 142 moves left and lever 141 rotates clockwise thereby moving the axis of the lever (center of shaft 139) clockwise about the center of trunnions 140. Considering the upper end of lever 138 as fixed, the valve 136 will be moved toward the left and hence toward a position for blocking the ports 132 and 133. Conversely when ports 130 and 132 are connected for the purpose of effecting right movement of rod 124 to decrease the coupling slip, valve 136 will move right toward position for blocking port 132. This stabilizing means is sufficient under normal conditions; that is, when the pressure selection is gradually changed, or when there is a gradual change in altitude at the same pressure selection.

When there is a sudden increase of pressure selection as in emergency, for example, other stabilizing means are provided to prevent surging or hunting. For this purpose the left end of piston rod 124 is attached to a disc 150 located between springs 151 and 152 housed in a cylinder 153 provided by a dash-pot piston 154 having notches 155 and slidable in a dashpot cylinder 156 which is attached to a cylinder 157 which receives a piston 158 urged right by spring 159 and attached to a rod 161 carrying a pin 161a received by the forked end of a lever 162 pivoted at 163 and connected by link 164 with a screw-eye 165 attached to the shaft 64. A wall 170 separating the cylinder 157 from the cylinder 156 is provided with a plain orifice 171 and an orifice 172 controlled by a check valve 173.

A sudden increase of pressure demand will be accompanied by a relatively rapid left movement of the rod 124 thereby increasing the compression of spring 151 which urges the dashpot piston 154 toward the left increasing the pressure in the oil between the pistons 154 and 158. This causes the piston 158 to move toward the left against the action of spring 159 causing clockwise rotation of bell crank lever 162 and of the shaft 64, thereby rocking the axis of the lever 63 clockwise about the axis of the trunnions 65. This action tends to move the valve 43 toward the left from a position in which it had connected ports 34 and 33. The effect is the same as though the pressure selection had been reduced. The left movement of valve 43 is accompanied by movement of the valve 11 toward closed position; and this results in movement of valve 136 toward the left toward a position disconnecting port 133 from port 130 and opening port 132 whereupon the speed of the auxiliary supercharger 95 is momentarily reduced by right movement of the piston 122. As piston 122 moves right, the pressure of spring 151 to the left upon the dashpot piston 154 is relieved and piston 158 returns to normal position by the spring 159 whereupon the shaft 64 is rotated counterclockwise about the axis of trunnions 65 to normal position. Thus by momentarily effecting a drop in the pressure selection when there is a relatively rapid movement of the rod 124 toward the left to increase auxiliary supercharger speed, the tendency to over-speed the supercharger is minimized and stability of control is effected and equilibrium is established in the minimum time.

The following example is given to show the function of the stabilizer 160 in preventing hunting when a quick change is made in pressure selection. Suppose the pressure selection is 40" Hg, as indicated by line A—B in Fig. 4, and that the speed control servo 120 is in equilibrium status for so controlling the speed of the supercharger 95 that the selected pressure will be maintained. When in this status, the throttle valve 11 will be substantially wide open. That is, it will be vibrating to a small amplitude angularly between wide open position and a position very slightly under wide open position. Suppose that there is a sudden demand for 50" Hg pressure as represented by line E—F in Fig. 4, it is desirable that this increase be made in the minimum time without hunting, this time being represented by $t$ in Fig. 4. The demand for 50" Hg pressure causes the throttle-operating-servo to move the throttle valve 11 to fully wide open position and this movement is accomplished by movement of the rod 147 toward the left so as to effect connection of ports 130 and 133 of the servo 120 whereupon the piston 122 moves rapidly toward the left to increase the auxiliary supercharger speed rapidly thereby increasing the pressure rapidly as indicated by the curved line B—C. Now the pressure does not increase immediately to 50" but to some value less than 50", as indicated by point $c$. This occurs by reason of the fact that the quick left movement of the piston 122 effects a reduction in pressure selection to the operation of the stabilizer piston 158 as has been described. Left movement of the piston 51 effects compression of spring 150 thereby increasing its force as applied to dashpot piston 154 to move oil from cylinder 156 into cylinder 157 through orifice 171, check valve 173 being closed. As the oil rushes through orifice 171, the piston 158 is forced left against the action of spring 159 and its motion is imparted by lever 162, link 164, screw-eye 165 and shaft 64 to cause clockwise rotation thereof about its trunnions 65 thereby lifting the center of shaft 64 and the fulcrum of lever 62. This causes, in effect, a reduction of pressure selection because the lifting of lever 63 with its cam follower 69 in engagement with the cam 70 causes a right movement of the link 61 and a left movement of the valve 43. There is a momentary decrease of pressure to value D because the left movement of valve 43 is sufficient to effect a momentary right movement of piston 23 and a momentary closing of the throttle valve 11. Therefore, for an instant, the speed of the auxiliary supercharger 95 decreases. While all of this is taking place, some time has elapsed sufficient for some of the oil which is forced through the orifice 171 to move through grooves 158$a$ in the periphery of the piston 158 and to the left of said piston and the piston will start moving toward the right under the action of the spring 159 thereby effecting an increase of pressure selection to some value such as $C_1$ (Fig. 4) which is a little higher than C but still less than 50". The increase of pressure demand to the value C1 is accomplished by movement of the throttle to wide open position thereby causing the speed-controlling-servo to increase the speed of the supercharger 95; and such speed increase produces, through the action of the stabilizer 120, a momentary decrease in pressure selection to some value such as D1. The oscillation from C1 to D1 is less than the oscillation C to D. It is therefore apparent that the change from 40" to 50" pressure selection, when a quick demand is made, is effected by a series of steps of oscillation as represented by the curved lines B—C—D—C1—D1—C2—D2—C3—D3, etc. said oscillations decreasing rapidly. Thus the pressure selection represented by E is reached in the minimum time with practically no hunting, the surging in the supercharger being practically negligible, and the supercharger speed required to satisfy the pressure demand is not exceeded.

While the embodiment of the present invention as herein disclosed, constitutes a preferred form, it is to be understood that other forms might be adopted, all coming within the scope of the claims which follow.

What is claimed is as follows:

1. Control apparatus for supercharged internal combustion aircraft engines comprising a throttle valve movable to different positions to control the pressure in the engine intake, means for selecting a pressure to be maintained, means controlled by the intake pressure for automatically moving the throttle so as to maintain any selected pressure during operation of the aircraft at different altitudes, a supercharger for said engine, means for driving said supercharger at any desired speed between minimum and maximum limits, means for controlling the supercharger speed, a hydraulic servomotor for actuating the speed controlling means of the supercharger, a valve for controlling the operation of said servomotor and means for operating said valve including an arm connected to the throttle operating mechanism, operating connections extending to said valve and actuated by said arm when the throttle is moved to a predetermined open position and means for moving said valve in the opposite direction to prevent over-speeding of the supercharger.

2. Control apparatus for internal combustion aircraft engines comprising a throttle valve movable to different positions to control the pressure in the intake, a selector cam and means for moving said cam to select a pressure to be maintained, means controlled by the intake pressure for automatically moving the throttle so as to maintain any selected pressure during operation of the aircraft at different altitudes up to a maximum altitude at which the throttle is moved to its wide open position in order to maintain the pressure selected, a variable speed supercharger for said engine, means for controlling the speed of operation of said supercharger including a control member movable to different positions, a servomotor having a piston connected to said control member, and operable to move said control member to different positions, a control valve for controlling the servomotor, an actuating member for said valve means operated by the mechanism which moves the throttle valve for effecting movements of said actuating member and effective to engage and move said actuating member in a direction to effect an increase in supercharger speed when the throttle reaches a predetermined partially open position and means for moving the throttle toward closed position when the supercharger speed has been increased.

3. Control apparatus for internal combustion aircraft engines comprising a throttle valve movable to different positions to control the pressure in the intake, a selector cam and means for moving said cam to select a pressure to be maintained, means controlled by the intake pressure for automatically moving the throttle so as to maintain any selected pressure during operation of the aircraft at different altitudes up to a maximum altitude at which the throttle is moved to its wide open position in order to maintain the pressure selected, a variable speed supercharger for said engine, means for controlling the speed of operation of said supercharger including a control member movable to different positions, a servomotor having a piston connected to said control member and operable to move said control member to different positions to effect operation of the supercharger at different speeds, an actuating member for said valve means operated by the throttle operating mechanism for actuating said valve and a dash pot mechanism for controlling the speed of operation of the servo piston, said dash pot comprising a cylinder and a piston slidable therein, said last named piston being operatively connected to the pistons of the servomotor.

4. Control apparatus for internal combustion aircraft engines comprising a throttle valve movable to different positions to control the pressure in the intake, a selector cam and means for moving said cam to select a pressure to be maintained, means controlled by the intake pressure for automatically moving the throttle so as to maintain any selected pressure during operation of the aircraft at different altitudes up to a maximum altitude at which the throttle is moved to its wide open position in order to maintain the pressure selected, a variable speed supercharger for said engine, means for controlling the speed of operation of said supercharger including a control member movable to different positions, a servomotor having a piston connected to said control member and operable to move said control member to different positions to effect operation of the supercharger at different speeds, an actuating member for said valve means operated by the throttle operating mechanism for actuating said valve and a dash pot mechanism for controlling the speed of operation of the servo piston, said dash pot comprising a cylinder and a piston slidable therein, said last named piston being operatively and resiliently connected to the piston of the servomotor.

5. Control apparatus for internal combustion aircraft engines comprising a throttle valve movable to different positions to control the pressure in the intake, a selector cam and means for moving said cam to select a pressure to be maintained, means controlled by the intake pressure for automatically moving the throttle so as to maintain any selected pressure during operation of the aircraft at different altitudes up to a maximum altitude at which the throttle is moved to its wide open position in order to maintain the pressure selected, a variable speed supercharger for said engine, means for controlling the speed of operation of said supercharger including a control member movable to different positions, a servomotor having a piston connected to said control member and operable to move said control member to different positions to effect operation of the supercharger at different speeds, an actuating member for said valve means operated by the throttle operating mechanism for actuating said valve, a dash pot mechanism for controlling the speed of movement of the servo piston, said dash pot comprising a cylinder and a piston slidable therein operatively connected to the piston of the servo and means operated upon increase in supercharger speed for modifying the pressure selection, said means including a third piston slidable in a cylinder in communication with the dash pot cylinder so that movement of the dash pot piston exerts pressure on said third piston to effect movement thereof.

6. Control apparatus for internal combustion aircraft engines comprising a throttle valve movable to different positions to control the pressure in the intake, a selector cam and means for moving said cam to select a pressure to be maintained, means controlled by the intake pressure for automatically moving the throttle so as to maintain any selected pressure during operation of the aircraft at different altitudes up to a maximum altitude at which the throttle is moved to its wide open position in order to maintain the pressure selected, a variable speed supercharger for said engine, means for controlling the speed of operation of said supercharger including a control member movable to different positions, a servomotor having a piston connected to said control member and operable to move said control member to different positions, a control valve for controlling the servomotor, a pivoted actuating lever for moving said valve means actuated by the throttle operating means for moving said lever in a direction to increase the supercharger speed as the throttle approaches fully open position and means operated by the servomotor as it is moved to increase the supercharger speed to move the pivot of the valve actuating lever in order to effect a movement of the valve.

References Cited in the file of this patent
UNITED STATES PATENTS

| | | |
|---|---|---|
| 1,983,225 | Gregg | Dec. 4, 1934 |
| 2,024,202 | Berger | Dec. 17, 1935 |
| 2,217,364 | Halford et al. | Oct. 8, 1940 |
| 2,228,239 | Ammann | Jan. 14, 1941 |
| 2,297,235 | Muller | Sept. 29, 1942 |
| 2,305,810 | Muller | Dec. 22, 1942 |
| 2,355,759 | Stokes | Aug. 15, 1944 |
| 2,400,306 | Hobbs | May 14, 1946 |
| 2,403,398 | Reggio | July 2, 1946 |
| 2,403,399 | Reggio | July 2, 1946 |
| 2,429,423 | Mock | Oct. 21, 1947 |
| 2,667,150 | Coar | Jan. 26, 1954 |
| 2,678,642 | Alexanderson et al. | May 18, 1954 |
| 2,679,297 | Eastman et al. | May 25, 1954 |